United States Patent [19]

Fischbach

[11] Patent Number: 4,974,287
[45] Date of Patent: Dec. 4, 1990

[54] CONNECTING ASSEMBLY

[75] Inventor: Wolfgang Fischbach, Daaden, Fed. Rep. of Germany

[73] Assignee: Heinrich Baumgarten KG Spezialfabrik fuer Beschlagteile, Neunkirchen, Fed. Rep. of Germany

[21] Appl. No.: 309,273

[22] Filed: Feb. 10, 1989

[30] Foreign Application Priority Data

Feb. 19, 1988 [DE] Fed. Rep. of Germany ....... 3805229

[51] Int. Cl.$^5$ .............................................. A47J 45/06
[52] U.S. Cl. ................................ 16/114 A; 16/110 A; 403/361
[58] Field of Search ........ 16/114 A, 110 A, DIG. 24; 403/361

[56] References Cited

U.S. PATENT DOCUMENTS

| 2,755,114 | 7/1956 | Becker | 403/361 |
| 3,329,452 | 7/1967 | Ammon | 403/361 |
| 4,761,851 | 8/1988 | Day et al. | 16/110 A |

Primary Examiner—Richard K. Seidel
Assistant Examiner—Carmine Cuda
Attorney, Agent, or Firm—Flynn, Thiel, Boutell, & Tanis

[57] ABSTRACT

A connecting assembly for connecting a handle member to a utensil. The utensil has an outer face to which is secured a support member of polygonal cross section and adapted to have the handle member attached thereto. The handle member includes a frontal cavity with a cross section generally conforming to that of the support member. The cavity is generally larger in cross section than the cross section of the support member. A spring member is provided and includes two integrally connected surface portions arranged at an angle to each other and is oriented between a pair of surfaces on the support member and a pair of interior wall surfaces in the cavity. The spring member includes structure for creating a spring force biasing the handle member in a direction transverse to the support member so that at least two wall surfaces on the support member will be urged into a direct form-fitting engagement with two other wall surfaces in the cavity. The spring member also includes a locking portion for releasably positively fixing the spring member to the support member.

11 Claims, 1 Drawing Sheet

CONNECTING ASSEMBLY

FIELD OF THE INVENTION

The invention relates to a member connecting assembly for connecting a handle member to a utensil, including a support member of polygonal cross section secured to an outer face of the utensil, including in the handle member a frontal cavity of a cross section matching that of a support member bracket, and including a spring member arranged in the region of the cavity so as to be engageable with the support member and with the handle member.

BACKGROUND OF THE INVENTION

With a conventional utensil of the type mentioned above, the handle member may be secured thereto in a non-turnable manner by a support member that is fixed to the utensil and is exactly shaped and dimensioned so as to fit the cavity in the handle member. The latter is plug-mounted to the support member such that it cannot get loose owing to the spring member. In order to attach the handle member to the support member and thus to the utensil in such a way that no relative movement would be possible between the handle member and the support member, it is necessary to have the cavity in the handle member accurately match the outer dimensions of the support member. Especially where cost-saving is aimed at in manufacturing such a utensil, it is disadvantageous if both the handle member and the support member must be precision-machined.

Another drawback of the conventional design is that it is necessary to affix the support member, e.g. by welding, to the utensil immediately after the same has been deep-drawn or flow-turned to its shape which may be that of a cooking pot or a pan. Usually such a vessel is surface-treated afterwards, e.g. enamelled, or provided with a color coating at least at its outer surface. Such processing is liable to alter the dimensions of the support member, too, since the color coating or the enamel layer will adhere to it as well. In such case it is impossible, or possible only upon a touch-up of the support member, to push the handle member onto it. Where the inner surfaces of the vessel or utensil are teflon-coated (i.e. bear a layer of polytetrafluorethylene), the outer surface of the utensil must be subjected to a cleaning procedure such as chemical etching. The cleaning procedure will roughen the surface of the support member so that, on the one hand, the handle member can be pushed on with difficulty only, and on the other hand there may occur an undesirable play between the support member and the cavity in the handle member. Although it is possible to facilitate the handle mounting by applying to the respective faces a lubrication agent such as grease, this will require an additional phase in manufacture which is often intolerable due to rising expenditures.

SUMMARY OF THE INVENTION

It is an object of the invention to provide a utensil having a handle member attachable thereto, of the type mentioned initially, which is of simple structure and easily manageable for convenient affixing of the handle member. A further aim is to definitely prevent any relative movement between the utensil and the handle member attached thereto.

The invention is characterized in that the spring member comprises two substantially plane, integrally connected, flat portions which are arranged at an angle to each other and which engage two lateral faces of the support member as well as associated faces of the cavity, and in that the handle member is adapted to be positively locked to the support member.

The utensil according to the invention is distinguished by a number of considerable advantages. Thus it is possible due to the invention to dispense with form-fit machining of the cavity in the handle member and of the support member, as the spring member is designed to compensate for inaccuracies and tolerances of the fit. Since the spring member is within the cavity of the handle member in such arrangement that it engages at least two side faces both of the support member and of the handle cavity, there is positive matching in that the support member is pressed onto cavity walls in the handle member. With a polygonal cross section, it is safeguarded that any relative movement between the handle member and the vessel or utensil is precluded. There is a form-fit locking of the handle member to the utensil, either by positive engagement of the support member to the handle member or by an additional retaining element.

Another advantage of the invention consists in the simple structure of the spring member which can, therefore, be manufactured at low cost. The spring member being substantially plane and flat, it can be produced by metal sheet or plate bending. This results not only in economic manufacture but also in particularly easy adaptation to requirements with accurate dimensioning.

It is of special advantage if the support member and the cavity in the handle member are each of rectangular cross section. Thereby, the spring member may expediently be designed such that its portions enclose a 90-degree angle. The embodiment thus permits of particularly simple and cost-saving production of both the support member and the handle member. Moreover the spring member design is advantageous in that, on the one hand, its manufacture is simplified and in that, on the other hand, it is warranted thereby that the support member engages the handle cavity by two faces at a right angle to each other.

Another very practical embodiment of the spring member comprises its portions being curved in themselves, preferably with the curving being convex relative to the faces that are directed towards the support member. This design warrants that the spring member will provide tensioning sufficient to press at least two side faces of the support member onto cavity faces of the handle member.

In a further advantageous embodiment, the spring member portions have lengths roughly corresponding to the length of the support member. As an engaging force onto the handle member will be available from the spring member almost throughout the total length of the support member, this design will definitely prevent the handle member from getting loose or yielding relative to the utensil, the support member being pressed onto the handle member over a sufficient length.

Also favorable is an embodiment of the spring member wherein at least one of its portions includes a lateral projection, e.g. a lug, that is adapted to engage a retaining groove of the handle member whereat, consequently, the spring member is securely held. Therefore, it is possible in the course of the utensil manufacture to associate the spring member to the handle member such that no provisions must be made for managing the spring member while the handle member is affixed to the utensil. In particular, it is prevented that the spring member could drop or get lost.

Yet another highly functional development of the invention is provided by a part of a spring member portion being bent off towards the support member, for example by an acute angle, with the support member having a relief for receiving the bent-off part, the free end of which is adapted to engage an inner face of the relief in the support member. Owing to such design it is possible to lock the handle member on the support member by means of the spring member and to thus prevent any inadvertent pull-off or other detachment of the handle member. In this connection it is very useful if the inner face of the relief is skewed relative to the longitudinal axis of the support member, whereby play-free support of the handle member at the utensil is safeguarded. For, as the handle member is pushed on, the free end of the bent-off part slides along the slope so as to provide secure locking action.

It is furthermore expedient if the spring member includes free extremities which are directed towards the utensil and which comprise entering slopes, for instance by way of a bent-off lug that will facilitate pushing on the handle member.

Further there may be an advantage in having a terminating section of the support member of such design as to form-fit the handle member cavity which, however, need extend over a small portion of the overall length of the support member only. Even under forcible turning of the handle, this will definitely prevent the deformation of the spring member.

Suitably, a socket portion of the handle member, directed towards the utensil, may be designed to be encompassed by a bush that is frontally flush with the socket portion. This bush can, on the one hand, provide an additional support action and it will, on the other hand, serve to prevent a break-out of the socket portion of the handle member which might occur where the same is made of plastics. Thirdly, the bush may cover a pinhole required for removing the spring retention portion from its mold.

BRIEF DESCRIPTION OF THE DRAWINGS

The invention will now be described, by way of examples, with reference to the accompanying drawing in which.

DETAILED DESCRIPTION

Figure 1:
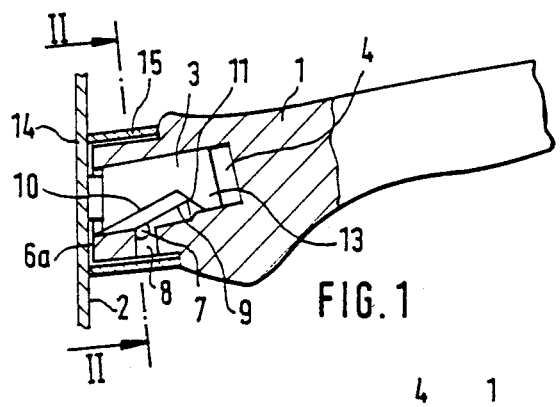
FIG. 1 is a side elevation, partly sectional, of a first embodiment.
Figure 2:
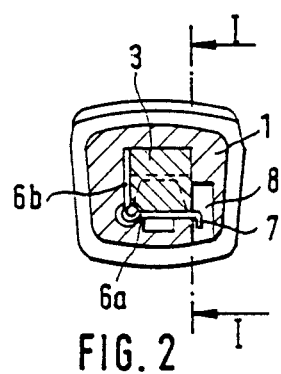
FIG. 2 is a sectional view along line II—II in FIG. 1.

FIGS. 1 and 2 show sectional views of a first embodiment of the invention. More particularly, FIG. 1 is a side elevation with partial section along line I—I of FIG. 2, which latter is a sectional view along line II—II of FIG. 1.

In the embodiment of FIGS. 1 and 2, a handle member 1 is designed as a shaft handle, e.g. for a frying pan. To an outer face 2 of a vessel or utensil (not otherwise shown), there is attached a support member 3 which—as will be seen from FIG. 2—is substantially of rectangular cross section and is adapted to be introduced into a cavity 4 within handle member 1. The support member 3 may also be designed to form a bracket of U-shaped cross section.

Cavity 4 is likewise of square cross section and is designed such that handle member 1 can be plug-mounted onto support member 3. Essentially, cavity 4 extends along the longitudinal axis of handle member 1 which axis is arranged at an angle to outer face 2 of the utensil. Therefore, it is necessary to also have the support member 3 inclined relative to the outer face 2. The fixing of the support member 3 is effected in a conventional manner such as by welding.

Within cavity 4, there is a spring member 5 comprising two integrally connected, substantially plane, flat portions 6a and 6b which are arranged at a substantially right angle to each other. The support member 3 is pressed, by means of spring member 5, onto the faces of cavity 4 within handle member 1 as shown in FIG. 2 where it is seen that, in this case, the upper and right-hand faces of support member 3 directly engage the handle member 1.

It will be noted from FIG. 1 in particular that support member 3 includes a relief 10 the side elevation of which shows a triangular shape. Thus that face of relief 10 which is opposite to the utensil is inclined relative to the longitudinal axis of handle member 1 so as to rise towards the outer face 2 of the utensil. Owing to the relief 10, is it possible to lock without play the handle member 1 on the utensil, as will be described hereinbelow.

Figures 3, 5:
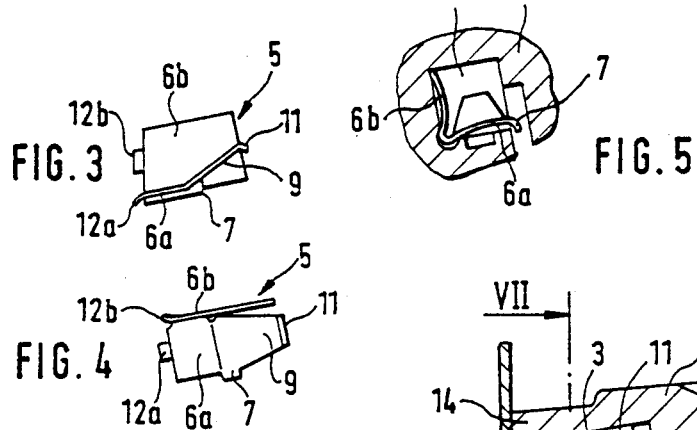
FIG. 3 is a side elevation of an embodiment of a spring member according to the invention, in an arrangement as shown in FIG. 1.
FIG. 5 is a sectional view similar to FIG. 2.
Figures 4, 6:
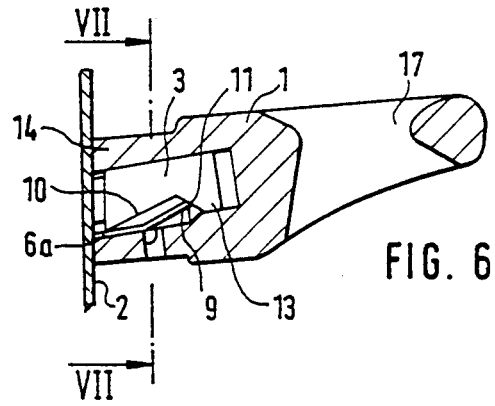
FIG. 4 is a top view of the spring member of FIG. 3.
FIG. 6 is a side elevation, similar to FIG. 1, of another embodiment of the invention.

FIGS. 3 and 4 show a side elevation and a top view, respectively, of spring member 5 according to the invention, with the position of spring member 5 in FIG. 3 corresponding to that of FIG. 1. As mentioned above, spring member 5 comprises two substantially plane portions 6a, 6b that enclose a 90-degree angle. One of these portions, to wit 6a, is provided with a catch-like lug 7 projecting both laterally and relative to the outer face of portion 6a.

Further, handle member 1 includes a retaining groove 8 (see FIGS. 1 and 2) dimensioned and arranged such that lug 7 can be introduced into retaining groove 8. As will be realized from the combination of FIGS. 1 and 2, the joint action of lug 7 and retaining groove 8 prevents shifting of the spring member 5 in the longitudinal direction of the handle member axis. Thus the attachment of spring element 5 by means of lug 7 and retaining groove 8 is especially expedient in the preassembly of spring element 5 to handle member 1. In addition, a locking effect is obtained which prevents pulling the handle member 1 off from support member 3.

Spring member 5 is, moreover, designed to include a constituent or part 9 that has a free end 11 and is inclined at an acute angle relative to the plane of portion 6a. The direction of inclination of part 9 is chosen such that it extends into relief 10 of support member 3, with the free end 11 of part 9 engaging the inner face(s) of relief 10 in support member 3. Thus the handle member 1 is locked relative to support member 3, which locking is to be seen particularly in FIG. 1. The locking effect of the free end 11 of part 9 prevents that handle member 1—once attached to support member 3—can be pulled off from the latter.

In order to obtain the locking effect, it is necessary that lug 7 engage the handle member 1 in the retaining groove 8. In this design, therefore, spring member 5 not only serves to prevent any loose fit of handle member 1; rather, the latter is tightly locked relative to support member 3, with the locking effect being due to the inclination of the lateral faces of relief 10 as explained.

At the side towards the outer face 2 of the utensil, the spring member includes free extremities 12a, 12b of the portions 6a, 6b which extremities are lug-shaped and are each inclined relative to the outer face of the respective portion. These free extremities 12a, 12b facilitate the plug-mounting of handle member 1 onto support member 3, precluding any clamping of the spring member during the fixing procedure.

In order that the spring member 5 would provide a force that biasses the handle member 1 in a direction transverse to support member 3, it is necessary that the spring member 5 be somewhat deformed. For this purpose, portions 6a, 6b of spring element 5 may be convex or bulging as shown in FIG. 5 in a simplified manner. In this embodiment, spring member 5 is inserted in the cavity 4 of handle member 1. When the latter is pushed onto support member 3, this will result in an elastic deformation of spring element 5 whereby it will assume that shape shown (again in a simplified way) in FIG. 2.

Figure 7:
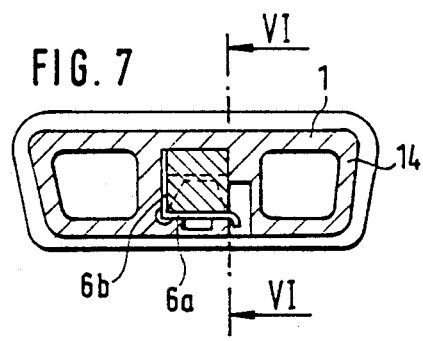
FIG. 7 is a sectional view along line VII—VII in FIG. 6.

Another embodiment of the invention is represented in FIGS. 6 and 7, differing from the embodiments of FIGS. 1 to 4 only in respect of the shape of handle member 1. As shown in FIGS. 6 and 7, handle member 1 comprises a reach-through hole 17 which may be useful e.g. for a cooking pot handle. As for the rest, like elements are designated by like reference numerals, and consequently a repetition of the respective detailed disclosure can be dispensed with.

The embodiments shown permit such dimensioning of a terminating section 13 of support member 3, i.e. of its outermost end, that the support member 3 can be closely fitted into the cavity 4. Such fitting is required for a short length of support member 3 only and will prevent any inadvertent loading or deforming action on the spring portions 6a, 6b even under forced torsional strain by the handle. As will be seen from FIG. 1, it is furthermore possible to provide a bush 15 encompassing a socket portion 14 of handle member 1, said socket portion 14 being adjacent the outer face 2 of the utensil. Bush 15 may be dimensioned such that in the event of a load, handle member 1 will be supported by bush 15 so as to warrant proper power transmission and to prevent any break-up of the socket portion 14 of handle member 1 in the case of excessive strain. Bush 15 may either be flush with the socket portion 14 or it may be somewhat longer, as shown in FIG. 1, so that the front face of socket portion 14 of handle member 1 will not directly engage the outer face 2 of the utensil. This may be of advantage, e.g. with regard to heat insulation.

Figure 8:
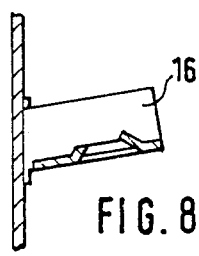
FIGS. 8 and 9 show a sectional and top view, respectively, of another support member embodiment.
Figure 9:

Support member 3 as shown in FIGS. 1 to 7 is a stay rod of solid cross section (FIG. 2). Without detracting from the supporting function of the member 3, it may be made of a U-shaped piece 16 of sheet metal including two branching or straddling lugs 18 for fixing the support piece 16 to the utensil (see FIGS. 8 and 9). Support piece 16 has, like support member 3, a corresponding relief 10 for receiving the projecting part 9 of spring member 5.

The invention is not restricted to the particular embodiments described. Rather, it is within the scope of the invention to suitably adapt the design of the spring member as well as the dimensioning and shaping of the support member cross section and of the handle member cavity as may be required.

The embodiments of the invention in which an exclusive property or privilege is claimed are defined as follows:

1. A connecting assembly for connecting a handle member to a utensil, said utensil having an outer face to which is secured a support member of polygonal cross section and adapted to have said handle member attached thereto, which handle member includes a frontal cavity of a cross section generally conforming to that of said support member, said connecting assembly including said cavity being larger in cross section than the cross section of said support member, a spring member arranged in said cavity between said support member and at least two interior walls of said cavity to facilitate a form-fit between said support member and said handle member on at least two other interior walls of said cavity, said spring member consisting of two integrally connected surface portions arranged at an angle to each other so as to engage two sets of opposing and conforming faces on both said support member and said two interior walls of said cavity, means on said spring member for creating a spring force biassing said handle member in a direction transverse to said support member so that at least two wall surfaces on said support member will be urged into a direct form-fitting engagement with said two other walls of said cavity, and said spring member further including a locking portion for releasable positive fixing said spring member to said support member.

2. The connecting assembly according to claim 1, wherein said support member as well as said cavity in said handle member are each of rectangular cross section and wherein said portions of said spring member enclose an angle of approximately 90°.

3. The connecting assembly according to claim 1, wherein said spring member includes free extremities which comprise entering slopes directed towards the utensil, wherein the respective lengths of said portions are shorter than the length of said support member.

4. The connecting assembly according to claim 1, wherein said handle member includes a retaining groove in said cavity, and wherein at least one of said portions of said spring member includes a lug adapted to engage said retaining groove.

5. The connecting assembly according to claim 1, wherein said locking portion of said spring member includes a bent part inclined towards said support member, and wherein said support member includes a relief for receiving said bent part, a free end of said bent part being adapted to engage an inner face of said relief for facilitating a locking of said handle member to said support member.

6. The connecting assembly according to claim 5, wherein said inner face of said relief is inclined relative to the longitudinal axis of said support member.

7. The connecting assembly according to claim 1, wherein a pair of mutually adjacent surfaces adjacent a free end portion of said support member form-fit said at least two other interior walls of said cavity in said handle member.

8. The connecting assembly according to claim 1, wherein said means on said spring member for creating a spring force includes said surface portions of said spring member being curved.

9. The connecting assembly according to claim 8, wherein said curved surface portions are both convex relative to said at least two interior walls of said cavity directed towards said support member.

10. The connecting assembly according to claim 1, wherein said support member has a solid cross section.

11. The connecting assembly according to claim 1, wherein said support member is a U-shaped sheet metal piece having two straddling lugs adapted to be fixed to the outer face of the utensil.

* * * * *